Figure 10:
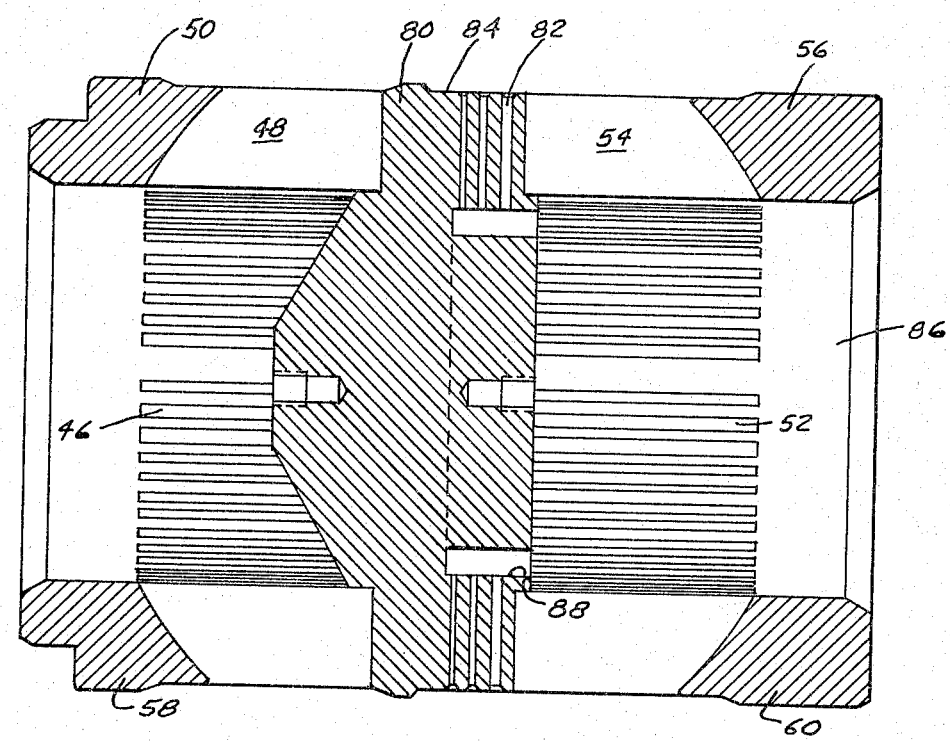

June 13, 1967 W. L. CONNOLLY 3,325,138
FLUID FLOW CONTROL DEVICE AND METHOD OF MANUFACTURING SAME
Filed July 2, 1964 4 Sheets—Sheet 1
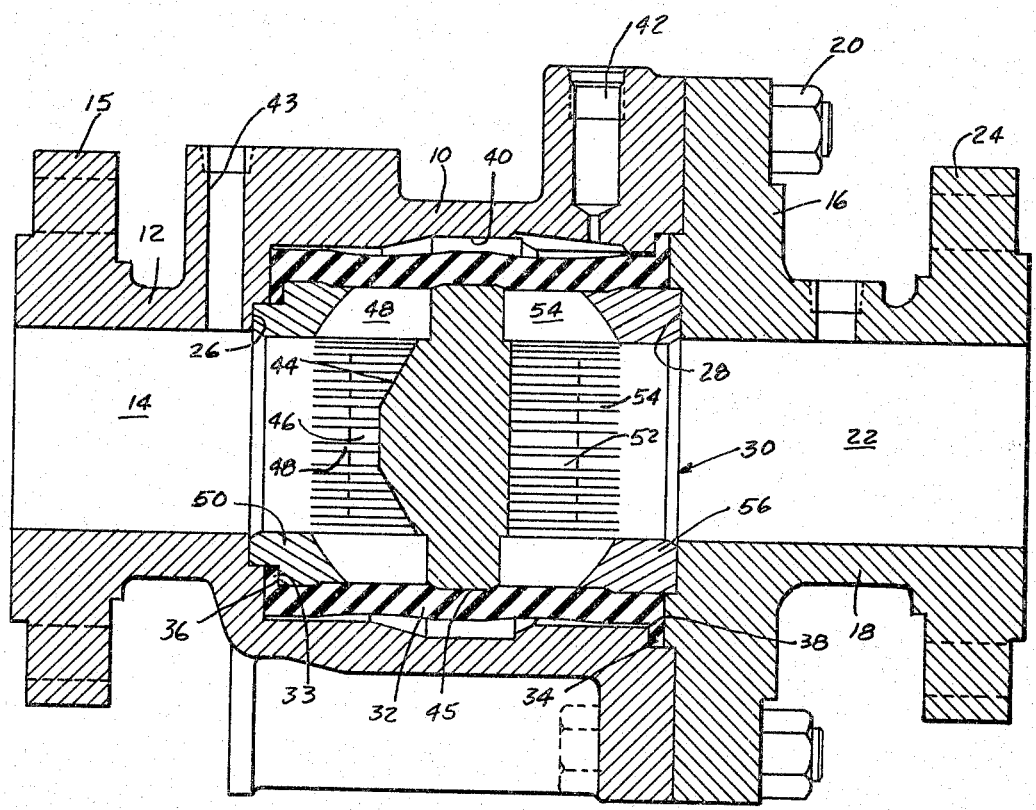
FIG-1-
INVENTOR.
WALTER L. CONNOLLY
BY Edward B. Gregg
ATTORNEY June 13, 1967 W. L. CONNOLLY 3,325,138
FLUID FLOW CONTROL DEVICE AND METHOD OF MANUFACTURING SAME
Filed July 2, 1964 4 Sheets-Sheet 2
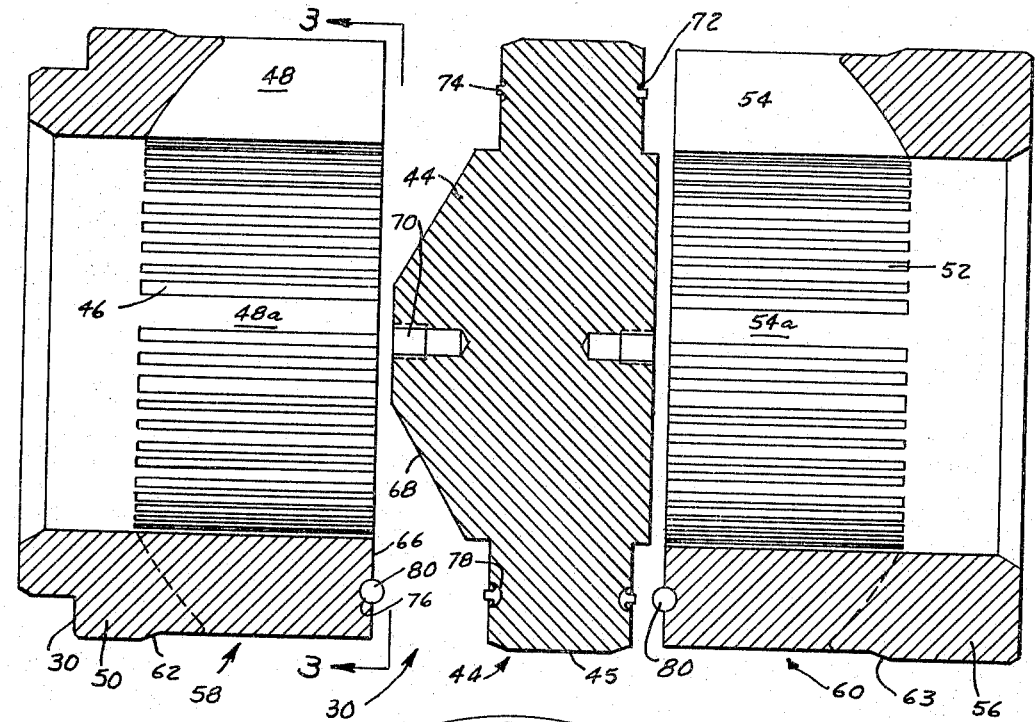
FIG-2-
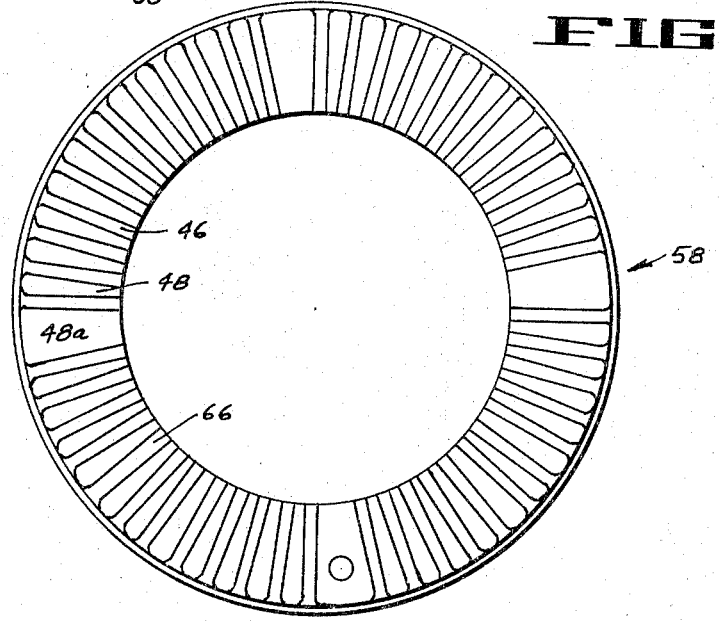
FIG-3-
INVENTOR.
WALTER L. CONNOLLY
BY Edward B. Grigg
ATTORNEY

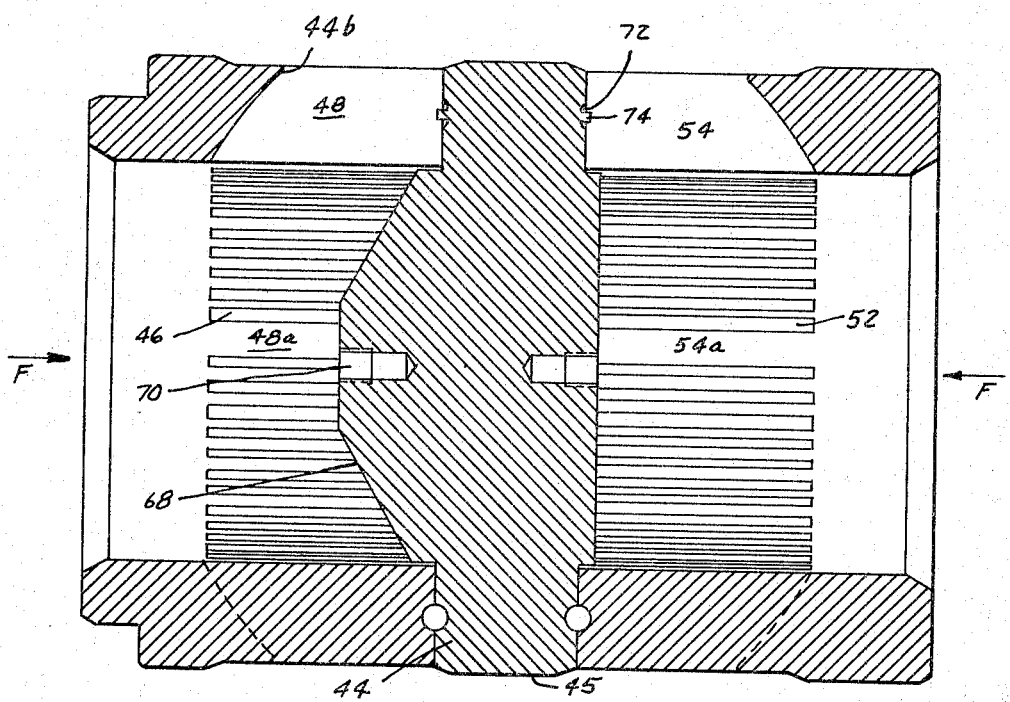
FIG-4-
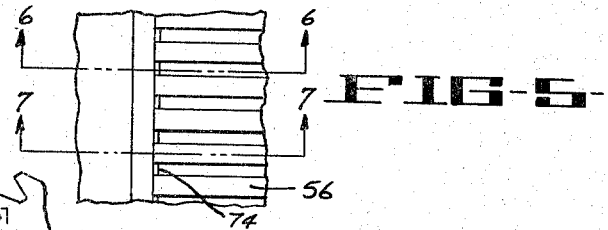
FIG-5-
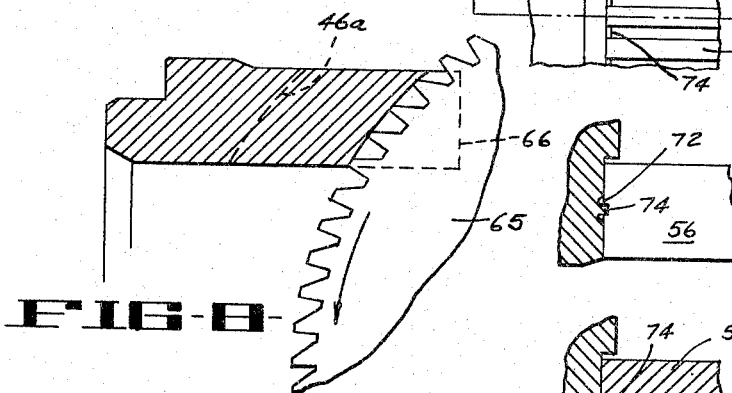
FIG-8-  FIG-6-  FIG-7-
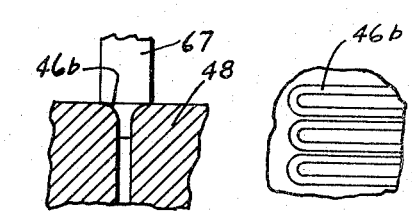
FIG-9-
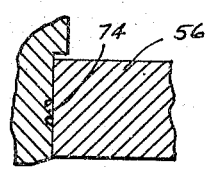
INVENTOR.
WALTER L. CONNOLLY
BY Edward B. Gregg
ATTORNEY

United States Patent Office 3,325,138
Patented June 13, 1967

3,325,138
FLUID FLOW CONTROL DEVICE AND METHOD OF MANUFACTURING SAME
Walter L. Connolly, Orinda, Calif., assignor to Grove Valve and Regulator Company, Oakland, Calif., a corporation of California
Filed July 2, 1964, Ser. No. 380,002
10 Claims. (Cl. 251—5)

This invention relates to a fluid flow control device and method of manufacturing same and, more particularly, to the method of manufacturing a slotted support core for the expansible sleeve of a fluid flow control valve of the type disclosed in United States Patent No. 2,353,143 granted July 11, 1944, to Austin U. Bryant.

Generally, the valve disclosed in that patent comprises a tubular housing having inlet and outlet flow passages around which are sealed the ends of a resilient, expansible sleeve. The sleeve is carried on a cylindrical support core sleeve that has two series of lengthwise slots around it, one toward each end with an imperforate surface between the two series of slots forming a sealing surface that is normally engaged by the expansible sleeve. Passage through the cylindrical core sleeve is blocked by a circular barrier or dam that extends across the sleeve in the location of the sealing surface. Consequently, flow through the control valve is possible only when fluid pressure through one series of slots expands the sleeve outward so that the fluid flows around the barrier and back through the other series of slots.

In operation, a control pressure is introduced into the housing around the resilient, expansible sleeve to augment the normal tension of the sleeve in resisting outward expansion. Thus, the sleeve remains in sealing relationship as long as the control pressure plus the sleeve tension is as great or greater than the upstream pressure. However, if the pressure within the expansible sleeve on the inlet side is great enough to overcome these opposing forces, the sleeve expands outward to permit flow out through the slots in the support core, across the sealing surface and then back through the slots on the outlet side to discharge through the outlet flow passage.

Fluid flow control devices of the type shown in the aforesaid Bryant patent have generally been produced with a cast, slotted core support sleeve, the outer surface of which is finished to provide the intermediate cylindrical sealing surface as well as surfaces at both ends which are accommodated and sealed within the valve housing. Such valves have worked satisfactorily in most installations but particularly where they are required for high pressure installations and core sleeves of substantial thicknesses are required it is extremely difficult to form the flow passage slots with sufficient accuracy by casting. Moreover, existing machine tools cannot practically be employed to form slots having the desired flow passage contour through the side of a cylindrical sleeve.

It is, therefore, an object of this invention to provide a core or carrier sleeve for an expansible sleeve valve having precisely dimensioned ribs and flow passage contours therebetween.

It is a further object of this invention to provide a method of manufacturing a core carrier that is efficient, economical and reliable.

In carrying out this invention, I form the core carrier in three parts, i.e., the intermediate circular dam or barrier and inlet and outlet slotted fluid transfer end portions. The end portions are formed from short cylindrical sleeves with their outer surface finished to provide the desired outer contour, and end sealing surfaces. Then, a series of slots are milled around the portion by cutting in from one annular end. In the meantime, the outer surface of the barrier is finished to form the desired sealing surface, and thereafter the elements are assembled with the circular barrier secured between the slotted end portions to form a unitary core support sleeve adapted to be secured within the valve housing. In one form of the invention, the milling cutter which forms the slots in the transfer portions is double indexed at regular intervals so that certain of the ribs are twice as large as the others. Each face of the barrier is finished to form an axially protruding crush ring around it that is opposed by the ends of the ribs on the end portion. Then the two slotted fluid transfer end portions are forced axially against the barrier from opposite sides so that the rib ends compress and deform the relatively weak crush ring and are thereby wedged in place against lateral movement that could otherwise produce vibration under fluid flow. The larger ribs which were formed by double indexing the milling cutter can withstand the compression forces which are required to deform the crush ring and wedge the elements together without flexing any significant amount. Thus, the larger ribs take the load so that the relatively thin ribs won't flex to cause the entire structure to twist. In this embodiment, I also provide a positioning device formed by cutting hemispherical depressions in the opposite faces of the barrier and in at least one of the larger ribs in both portions. A ball is press fitted into one of the depressions so that when the elements are forced together under axial compression, the mating depressions are held against displacement to maintain proper angular alignment of the element. Then, should it be necessary to disassemble the device, as for replacement of the expansible sleeve, the elements will automatically be realigned properly by placement of the ball on one element, within the hemispherical depression on the other.

Other objects and advantages of this invention will become apparent from the description following when read in conjunction with the accompanying drawings wherein:

FIG. 1 is a vertical section view of a fluid control valve embodying features of this invention;
FIG. 2 is a vertical section view showing the components of one form of expansible sleeve mounting core forming a part of this invention;
FIG. 3 is an end view of an end element of the core of FIG. 2 taken along line 3—3 of FIG. 2;
FIG. 4 is a vertical section view of the core of FIG. 2 as assembled;
FIG. 5 is a partial top view showing the joint between elements of the support core of FIG. 2;
FIGS. 6 and 7 are section views taken along lines 6—6 and 7—7, respectively, of FIG. 5;
FIG. 8 is a partial section view of an end element of the core of FIG. 2 showing the formation of the slots;
FIG. 9 is a portion view showing the finishing of the slot profiles; and
FIG. 10 is a vertical section view of another form of core support.

Now referring more particularly to FIG. 1, the flow control valve of this invention comprises a generally cylindrical housing 10 having an inlet hub 12 with flow passage 14 and suitable means such as the flange 15 shown for connection into a pipeline (not shown). An outlet closure 16 with a hub 18 extending therefrom may be secured to the main housing portion 10 as by means of studs 20. The outlet closure is provided with a suitable outlet flow passageway 22 and suitable means such as flange 24 for connection into the pipeline.

Supported within the housing in annular recesses 26 and 28 surrounding the flow passages 14 and 22 is a core support sleeve 30 for an expansible sleeve 32 which has inturned and outturned flanges 33 and 34 at the inlet and outlet ends thereof respectively. The inturned inlet flange is clamped between a shoulder 36 provided at the inlet end of the support core cage 30 and the wall of the housing 10 while the outturned downstream flange 34 is clamped between a shoulder 38 on the housing 10 and the inner surface of the outlet closure member 16. Thus the interior of the expansible sleeve 32 is sealed off from its exterior. The inner wall 40 of the housing around the expansible sleeve is of enlarged internal diameter between the ends of the expansible sleeve to provide a chamber into which the resilient sleeve 32 may expand. A suitable inlet duct 42 is provided to conduct a control fluid of predetermined pressure from some external source such as the upstream passage through the outlet 43. Such control fluid augments the tension or hoop strength of the expansible sleeve 32 in resisting expansion out of sealing contact with the core 30.

Intermediate, though not necessarily midway, the ends of the support cage core 30 is a dam or barrier 44 with an outer generally cylindrical sealing surface 45. The barrier 44 blocks flow of fluid directly from the inlet 14 to the outlet 22 so that inlet fluids can move downstream only by flowing outward through a series of slots 46 between ribs 48 that extend between the inlet end support ring portion 50 of the cage 30 and the barrier 44. Once fluid is able to flow through the slots 46 and around the barrier it may flow back into the cage through a second series of slots 52 with ribs 54 between connecting the barrier 44 to the outlet support ring portion 56 of the cage.

The structure as thus far described generally is substantially as shown in the aforesaid Bryant patent and operates in the manner now to be described. The control fluid is introduced into the chamber between housing inner wall 40 and the expansible sleeve 32 through the duct 42 to augment the natural tension in the resilient sleeve that normally, snugly engages and seals against the cylindrical sealing surface 45 around the barrier 44. If this total pressure is exceeded by the inlet pressure in passageway 14, the resilient expansible sleeve can be caused to expand outward under the pressure differential to permit flow of fluid through the slots 46 on the inlet side and around the barrier 44. When the fluid flows around the barrier it flows back into the outlet side slots 52 and out through the downstream passage 22. This invention is directed particularly to the structure of the core cage 30 and the method of its manufacture.

Referring now to FIGS. 2 and 3, it will be noted that the support cage is formed of three separate elements, inlet and outlet sleeve portion 58 and 60 and the intermediate barrier 44. The inlet and outlet portions 58 and 60 of the sleeve core 30 are cast or rolled initially as plain cylindrical sleeves which may be of identical configuration and thereafter finished to the desired profile. For example, the inlet portion 58 must be finished at the inlet end to a reduced diameter to provide the shoulder 36 that clamps against the inturned flange 33 of the expansible sleeve, as shown in FIG. 1. Additionally, both the inlet and outlet portions are preferably reduced in diameter along portions of their lengths spaced from the inlet and outlet ends respectively as shown at 62 and 63 to provide a slight clearance with the expansible sleeve 32 in areas of the cage wherein sealing is not effected. Then, as shown specifically in FIG. 8, a series of slots 44 are milled into one end of each of the inner and outer portions with a large circular cutter 65 that produces a smooth curved profile 46a at the inner ends of the slots. By proper selection of a milling cutter, the slots 44 and, hence, the ribs between them, can be shaped to precise dimensions for close control of flow capacity. As the operator cuts the slots in the incoming and outlet elements 58 and 60, he indexes from space to space so that the slots are equally spaced around the circumference of the annular end face 66. However, periodically the operator double indexes the machine so that an occasional strength rib 48a of double thickness is produced. As shown in FIG. 3, there are four such strength ribs for a purpose hereinafter to be described. After the slots 46 have been so cut an end mill 67 (FIG. 9) which is rotated about its own axis, may be moved along the slots 46 to form the smoothly contoured venturi configuration 46b.

In the meantime, the central barrier 44 is formed with its cylindrical outer surface 45 of a diameter slightly larger than that of the ribs 46 so that the expansible sleeve 32 will seat and seal firmly on the outer sealing surface 45 of the barrier. If desired, an enlarged, frusto-conical boss 68 may extend from the inlet side of the barrier in order to provide a smoother flow surface and to increase strength. Also, if desired tapped holes 70 (FIGS. 2 and 4) may be provided in the opposite faces of the barrier 44 to facilitate insertion and removal of the cage 30 from the housing 10.

As shown in FIGS. 4 to 7, there is formed in each circular face of the barrier 44 an annular groove 72 from the center of which there protrudes an annular crush ring 74 that extends axially beyond the face of the barrier 44. Additionally, opposing hemispherical depressions or sockets 76 and 78 are formed in the opposite faces of the barrier 44 and at least one of the strength ribs 48a, and press fit into one of each pair of depressions is a steel ball 80 to insure proper angular alignment of the elements 58, 44 and 60.

When it is desired to assemble the three elements of the core, they are arranged in the order illustrated in FIG. 2 with the steel balls aligned with their complementary hemispherical sockets.

Then as shown schematically in FIG. 4, the three elements are clamped together under sufficient axial force F to cause the ribs 46 and 52 to compress and deform the crush rings 74 until they become firmly interengaged as shown in FIGS. 5, 6 and 7 wherein the extending ribs are locked against lateral movement which might otherwise produce vibrations of the ribs. This is seen most clearly in FIGS. 4 to 7 wherein the crush ring 74 is shown compressed and flattened into the groove 72 by the ends of the ribs 56 (FIG. 7) while between the ribs (FIGS. 5 and 6) they extend to engage the sides of the ribs and hold them against lateral movement.

In FIG. 10, I show another form of my invention wherein the end portions 58 and 60 are permanently secured to the central barrier 80 as by silver soldering. Also in this form of the invention I provide a series of vents 82 that extend radially inward from the seal surface 84 to provide gradually increasing flow as the expansible sleeve moves away from the sealing surface for smoother operation. These vents may be easily formed in this barrier prior to assembly with the end portions 58 and 60 and they may be communicated with the downstream passage 86 by boring axial holes, or as shown, by cutting an annular groove 88 into the downstream side of the barrier 80.

While this invention has been described in connection with preferred embodiments thereof it is to be understood that modifications and changes therein may be made by those skilled in the art without departing from the spirit and scope of this invention as defined by the claims appended hereto.

Having described my invention, I claim:

1. For use in a flow control valve including a housing having inlet and outlet flow passages, an expansible sleeve in said housing open at opposite ends to said flow passages, means for delivering a control pressure to said housing against the outer surface of said expansible sleeve, and a barrier spanning the interior of said sleeve intermediate the ends thereof so that fluid flow between said passages is prevented without radial expansion of said sleeve, a support core for said sleeve comprising:

cylindrical, tubular inlet and outlet sections, one end of each of said sections comprising a circular series of ribs formed by a plurality of slots cut around said section from one annular face thereof, each of said slots extending generally parallel to the axis of the section for a substantial portion of the length thereof leaving an imperforate portion at the other annular end of the section, means on said other annular end adapting said section for mounting in said valve housing, means securing the ends of the ribs on said inlet and outlet sections to the inlet and outlet sides of said barrier, respectively, and means on said barrier securing the ends of said ribs against lateral movement.

2. The combination defined by claim 1 wherein said last-named means comprises:

an annular, axial protrusion on each of the inlet and outlet sides of said barrier, means forming arcuately spaced depressions around each of said protrusions, said ribs being secured against lateral movement by firm engagement of the ends of said ribs into said depressions.

3. The combination defined by claim 1 wherein said last-named means comprises:

a crush ring protruding from each of said inlet and outlet sides of said barrier, means forming arcuately spaced depressions around each of said crush rings, said ribs being secured against lateral movement by firm engagement of the ends of said ribs into said depressions.

4. The combination defined by claim 1 including:

means forming a hemispherical socket in the end face of a rib on each said section, means forming a complementary hemispherical socket in each of said inlet and outlet sides of said barrier, and a ball positioned in the aligned sockets in a rib and in the corresponding side of said barrier.

5. The combination defined by claim 3 wherein:

certain ones of said ribs are wider than the others so as to support axial forces against said one annular end without bending.

6. The method of forming a support core for an expansible sleeve valve control device comprising:

providing cylindrical tubular inlet and outlet sections, milling a plurality of slots around each of said sections from one annular face thereof, said slots extending axially a substantially portion of the length of said section to form ribs therebetween, forming an imperforate circular barrier, and securing the ends of the ribs of the inlet and outlet sections to opposite circular sides of said barrier.

7. The method of forming a support carrier for an expansible sleeve valve control device comprising:

providing cylindrical tubular inlet and outlet sections, milling a plurality of slots around each of said sections from one annular face thereof said slots extending axially a substantial portion of the length of said section to form ribs therebetween, forming an imperforate circular barrier, forming a relatively distortable ring protruding axially from each face of said barrier, arranging said inlet and outlet sections with the ends of the ribs thereon against the distortable rings on opposite sides of said barrier, and applying axially compressive forces against said sections to force said rib ends to crush portions of said distortable ring opposing them.

8. The method of forming a support carrier for an expansible sleeve valve control device comprising:

providing cylindrical tubular inlet and outlet sections, milling a plurality of slots around each of said sections from one annular face thereof, said slots extending axially a substantial portion of the length of said section to form ribs therebetween, forming an imperforate circular barrier, forming a relatively distortable ring protruding axially from each face of said barrier, forming complementary hemispherical sockets in the end of one rib of each of said sections and on each side of said barrier, arranging said inlet and outlet sections relative to said barrier by engaging a ball simultaneously in the socket on a rib and on the corresponding side of said barrier, and applying axially compressive forces against said sections to force said rib ends to crush portions of said deformable ring opposing them.

9. The method of forming a support carrier for an expansible sleeve of a flow control valve comprising:

providing cylindrical, tubular inlet and outlet sections, milling a series of slots around each of said sections from one annular face thereof to form a circular series of ribs, forming certain of said ribs of greater width than the others, providing a circular barrier, forming an annular crush ring protruding axially from opposite sides of said barrier, positioning said inlet and outlet sections co-axially from opposite sides of said barrier, positioning said inlet and outlet sections co-axially with said barrier between them and with the ends of said ribs engaging the crush rings on opposite sides of said barrier, and compressing said sections against said barrier to interlock said ribs with said crush ring by depressing portions thereof.

10. The method of forming a support carrier for an expansible sleeve of a flow control valve comprising:

providing cylindrical, tubular inlet and outlet sections, milling a series of slots around each of said sections from one annular face thereof to form a circular series of ribs, providing a circular barrier, forming an annular groove in the outlet side of said barrier, drilling at least one vent hole from the outer surface of said barrier to said groove, positioning said inlet and outlet sections co-axially with said barrier between them, and securing the ends of said ribs to opposite sides of said barrier.

References Cited

UNITED STATES PATENTS 2,360,873    10/1944    Grove _____ 251—5

FOREIGN PATENTS 1,072,853    1/1960    Germany.

M. CARY NELSON, *Primary Examiner.*

J. W. KNIGHT, *Assistant Examiner.*